US009425707B2

(12) United States Patent
Mutsuura et al.

(10) Patent No.: US 9,425,707 B2
(45) Date of Patent: Aug. 23, 2016

(54) INVERTER DEVICE CAPABLE OF APPROPRIATELY FIXING A POWER MODULE HAVING A SWITCHING ELEMENT AND A SMOOTHING CAPACITOR IN A LIMITED REGION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Keita Mutsuura, Anjo (JP); Tatsuya Kondo, Anjo (JP); Makoto Morita, Mishima (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 14/396,893

(22) PCT Filed: May 13, 2013

(86) PCT No.: PCT/JP2013/063293
§ 371 (c)(1),
(2) Date: Oct. 24, 2014

(87) PCT Pub. No.: WO2013/179880
PCT Pub. Date: Dec. 5, 2013

(65) Prior Publication Data
US 2015/0340966 A1 Nov. 26, 2015

(30) Foreign Application Priority Data
May 31, 2012 (JP) .................................. 2012-125115

(51) Int. Cl.
*H02B 1/20* (2006.01)
*H05K 1/14* (2006.01)
(Continued)

(52) U.S. Cl.
CPC ............ *H02M 7/5387* (2013.01); *H02M 7/003* (2013.01)

(58) Field of Classification Search
CPC . H02M 3/1584; H02M 7/493; H02M 7/5387; H02M 7/53873; H02M 7/53875; H02M 7/53871; H02M 7/003; H02M 2001/008; H02M 2007/4822
USPC .......... 323/269–272; 361/624, 637, 639, 738; 363/56.02, 56.09, 71, 78, 79, 97, 98, 363/146, 147
See application file for complete search history.

(56) References Cited

U.S. PATENT DOCUMENTS 5,497,289 A * 3/1996 Sugishima ............ H02M 7/003
318/558
8,829,669 B2 9/2014 Hotta et al.
(Continued)

FOREIGN PATENT DOCUMENTS

JP 2005-328651 A 11/2005
JP A-2005-347561 12/2005
(Continued)

*Primary Examiner* — Adolf Berhane
*Assistant Examiner* — Gary Nash
(74) *Attorney, Agent, or Firm* — Oliff PLC

(57) ABSTRACT

A compact inverter device that includes a power module having a switching element and a smoothing capacitor that converts electric power between DC power and AC power. The inverter is configured with a plate-like DC bus board to which the smoothing capacitor is fixed, a fixing member that maintains a relative positional relation between the DC bus board. The DC bus board has a plurality of connection positive terminals that are electrically connected to the positive electrode pattern and that are respectively electrically connected to the positive terminals of the plurality of power modules. The DC bus board and power modules are fixed to the fixing member by connection positive terminal and positive terminals through a common fastening member, and similarly on the negative terminals.

19 Claims, 9 Drawing Sheets

(51) Int. Cl.
  *H02H 7/122*    (2006.01)
  *H02M 1/00*     (2006.01)
  *H02M 7/5387*   (2007.01)
  *H02M 7/00*     (2006.01)

(56) References Cited

U.S. PATENT DOCUMENTS

| | | | | |
|---|---|---|---|---|
| 2004/0257841 | A1* | 12/2004 | Taguchi | H02M 1/12 363/40 |
| 2007/0109715 | A1 | 5/2007 | Azuma et al. | |
| 2009/0251875 | A1 | 10/2009 | Nagashima et al. | |
| 2011/0069466 | A1* | 3/2011 | Herron | H02M 7/003 361/803 |
| 2011/0148337 | A1* | 6/2011 | Yamada | H01L 25/072 318/400.26 |
| 2011/0221268 | A1 | 9/2011 | Kanazawa et al. | |
| 2011/0261600 | A1* | 10/2011 | Tachibana | H02M 7/003 363/131 |
| 2012/0045353 | A1* | 2/2012 | Watanabe | F04B 35/04 417/410.1 |

FOREIGN PATENT DOCUMENTS

| | | |
|---|---|---|
| JP | A-2007-143272 | 6/2007 |
| JP | A-2009-106046 | 5/2009 |
| JP | A-2009-106074 | 5/2009 |
| JP | A-2009-177872 | 8/2009 |
| JP | A-2009-213269 | 9/2009 |
| JP | 2010-104135 A | 5/2010 |
| JP | 2010-288328 A | 12/2010 |
| JP | 2011-135769 A | 7/2011 |
| JP | A-2012-070570 | 4/2012 |
| JP | A-2012-070632 | 4/2012 |
| JP | 2012-147596 A | 8/2012 |

* cited by examiner

INVERTER DEVICE CAPABLE OF APPROPRIATELY FIXING A POWER MODULE HAVING A SWITCHING ELEMENT AND A SMOOTHING CAPACITOR IN A LIMITED REGION

TECHNICAL FIELD

The present invention relates to inverter devices that include a power module having a switching element and a smoothing capacitor and that convert electric power between direct current (DC) power and alternating current (AC) power.

BACKGROUND ART

In recent years, hybrid vehicles and electric vehicles, which include a rotating electrical machine as a driving force source, have attracted attention in order to achieve energy saving and reduction in environmental burdens. Such vehicles are provided with a DC power supply such as a battery which supplies electric power when the rotating electrical machine functions as a driving force source, and which stores electric power generated when the rotating electrical machine functions as an electric generator. Since an AC rotating electrical machine is often used as the rotating electrical machine, an inverter device including an inverter circuit that converts electric power between DC power and AC power is mounted on such vehicles. Such an inverter device is also used in power control devices etc. However, especially when such an inverter device is mounted on vehicles, reduction in size of the inverter device is desired due to limitations on weight and mounting space, etc. Moreover, since the inverter circuit uses a component generating a large amount of heat such as a power module having a power switching element, a cooling mechanism is required to cool the inverter device. Accordingly, attempts have been made to implement an integrated device by accommodating the inverter circuit in, e.g., a case provided with cooling fins etc. and to reduce the size and weight of the inverter device.

For example, Japanese Patent Application Publication No. 2009-106046 (JP 2009-106046 A) (Patent Document 1) discloses an example of such an integrated inverter device. In this inverter device, a power module is placed on a flat surface in a case having a heat dissipating portion. A smoothing capacitor electrically connected to the power module is placed on a flat surface that is slightly lower than the flat surface on which the power module is placed, such that the smoothing capacitor adjoins the power module (seventh and eighth paragraphs, FIG. 1, etc.). A smoothing capacitor that is desired to have a high breakdown voltage and large capacitance tends to have a large physical size. In Patent Document 1, since the heat dissipating portion and the power module are placed so as to correspond to the height of the smoothing capacitor, the overall height of the inverter device can be reduced. However, in the case of this case, both the power module and the smoothing capacitor need be fixed to the case by bolts etc. For example, in FIG. 1 of Patent Document 1, the power module is fixed to the case by bolts, but the smoothing capacitor is merely fastened to electrodes extending in the horizontal direction from the power module by bolts. Providing a separate structure for fixing the smoothing capacitor to the case requires a space for the fixing structure for both the smoothing capacitor and the case, which may hinder reduction in size of the inverter device.

RELATED ART DOCUMENT

Patent Document

[Patent Document 1] Japanese Patent Application Publication No. 2009-106046 (JP 2009-106046 A)

SUMMARY OF THE INVENTION

Problem to be Solved by the Invention

It is therefore desired to implement an inverter device capable of appropriately fixing a power module having a switching element and a smoothing capacitor in a limited region.

Means for Solving the Problem

In view of the above problem, the present invention is characterized by an inverter device, which includes: a power module that has a positive terminal connected to a positive electrode of a DC power supply and a negative terminal connected to a negative electrode of the DC power supply, and that forms at least one arm formed by series connection of at least one switching element connected to the positive terminal and at least one switching element connected to the negative terminal; and a smoothing capacitor that is connected between the positive electrode of the DC power supply and the negative electrode of the DC power supply, and which converts electric power between DC power and AC power, including: a plate-like DC bus board which has a positive electrode pattern connected to the positive electrode of the DC power supply, and a negative electrode pattern connected to the negative electrode of the DC power supply, and in which a positive-side terminal of the smoothing capacitor is electrically connected to the positive electrode pattern, a negative-side terminal of the smoothing capacitor is electrically connected to the negative electrode pattern, and to which the smoothing capacitor is fixed; and a fixing member that maintains a relative positional relation between the DC bus board and a plurality of the power modules provided corresponding to a plurality of the arms corresponding to a plurality of phases of an alternating current, wherein the DC bus board has a plurality of connection positive terminals that are electrically connected to the positive electrode pattern and that are respectively electrically connected to the positive terminals of the plurality of power modules, and a plurality of connection negative terminals that are electrically connected to the negative electrode pattern and that are respectively electrically connected to the negative terminals of the plurality of power modules, and the connection positive terminal and the positive terminal which correspond to each other are fastened to the fixing member by a common fastening member, and the connection negative terminal and the negative terminal which correspond to each other are fastened to the fixing member by a common fastening member, so that the DC bus board and the power modules are fixed to the fixing member.

According to this characteristic configuration, the connection positive terminals of the DC bus board having the smoothing capacitor mounted thereon and the positive terminals of the power modules are fastened to the fixing member by the common fastening members. Moreover, the connection negative terminals of the DC bus board and the negative terminals of the power modules are fastened to the fixing member by the common fastening members. The DC bus board having the smoothing capacitor mounted thereon and the power modules are thus fixed to the fixing member. That is, the smoothing capacitor need not be separately fixed, and the smoothing capacitor (DC bus board) and the power modules are fixed to the fixing member by using the same fastening members. The DC bus board also serves as bus bars that connect the positive electrode and the negative electrode of the DC power supply to the power modules. Accordingly, an inverter circuit can be formed in a relatively small region. According to this characteristic configuration, an inverter device can be implemented which can appropriately fix a power module having a switching element and a smoothing capacitor in a limited region.

In the inverter device according to the present invention, it is preferable that the positive terminal and the negative terminal of the power module be provided as a DC electrode terminal pair that protrude from an end on one side of the power module. According to this configuration, connection portions with the DC bus board can be placed along the end on one side of each power module. The connection positive terminal and the connection negative terminal of the DC bus board can therefore be arranged next to each other, thereby facilitating simplification of the configuration of the DC bus board.

In the inverter device according to the present invention, it is preferable that the DC bus board include a DC electrode pattern connection terminal pair that are electrically connected to the positive electrode pattern and the negative electrode pattern, the fixing member include a DC power supply connection terminal pair that are connected to the positive electrode and the negative electrode of the DC power supply, and a DC bus board connection terminal pair that are electrically connected to the DC power supply terminal pair, and the DC electrode pattern connection terminal pair of the DC bus board be fastened to the DC bus board connection terminal pair by a fastening member. Typically, the DC power supply is provided separately from the inverter device, and DC power is supplied from the outside of the inverter device. On the other hand, it is preferable that the DC bus board and the power modules be integrated in a single package in view of insulation properties and cooling capability. Since the fixing member includes the DC power supply connection terminal pair and the DC bus board connection terminal pair, and both terminal pairs are electrically connected to each other, the inside of the inverter device can be satisfactorily separated from the outside thereof, and required electrical connection can be ensured between the DC power supply and the inverter device.

In the inverter device according to the present invention, it is preferable that a first electrode pattern as one of the positive electrode pattern and the negative electrode pattern be formed on a first board surface of the DC bus board as one surface of an insulating layer forming a substrate, and a second electrode pattern as the other of the positive electrode pattern and the negative electrode pattern be formed on a second board surface of the DC bus board as the other surface of the insulating layer, each terminal of the DC bus board be fastened by the fastening member such that the first board surface contacts terminals provided on other members, the terminal that is electrically connected to the second electrode pattern have a connection terminal surface that is formed on the first board surface so as to be separated from the first electrode pattern, and a conducting through hole that extends through the insulating layer and that is formed separately from a fastening member through hole through which the fastening member extends, and the conducting through hole have a conductive material on its inner wall, and the second electrode pattern be electrically connected to the connection terminal surface by the conductive material.

Bolts made of a conductive metal such as iron, etc. are often used as the fastening members. Accordingly, when a current flows between the first board surface and the second board surface of the DC bus board, the current also flows in the fastening members, which may increase the temperature of the terminals (DC electrode terminal pair) of the power modules and the peripheries thereof due to the heat generated by the fastening members. In the case where the conducting through hole having the conductive material on its inner wall is provided separately from the fastening member through hole as described above, most of the current flows between the first board surface and the second board surface of the DC bus board via the conducting through hole having lower impedance. This suppresses the current that flows in the fastening members, and can suppress heat generation of the fastening members. Providing the conducting through hole in this manner allows non-conductive members (made of a resin etc.) to be used as the fastening members. Accordingly, flexibility in selection of components is improved. The members made of a resin are typically lighter than members made of iron, and thus contribute to reduction in weight of the inverter device.

In the inverter device according to the present invention, it is preferable that the power modules be placed on both sides of the smoothing capacitor as viewed in a direction perpendicular to a board surface of the DC bus board. Power modules in which a large current flows often have a cooling mechanism such as a metal heat sink, and therefore are relatively heavy. Placing the power modules on both sides of the smoothing capacitor allows the fixing member to have a structure supported on both sides rather than on one side when fixing the power modules to the fixing member. This reduces stress that is applied to the fixing member.

In the inverter device according to the present invention, it is preferable that the plurality of power modules provided corresponding to the plurality of arms corresponding to the plurality of phases of the alternating current be arranged in line along one end surface of the DC bus board, the smoothing capacitor be formed by parallel connection of a plurality of capacitor elements, the number of capacitor elements correspond to that of power modules, and the capacitor elements be arranged so as to have a positional relation corresponding to that of the power modules. Since the smoothing capacitor is formed by the plurality of capacitor elements, capacitance of each capacitor element is reduced for the required capacitance as the smoothing capacitor. This can reduce the size of the capacitor elements. Accordingly, flexibility in layout of the smoothing capacitor is increased, and the smoothing capacitor can be accommodated in a relatively small space. Since the smoothing capacitors are evenly arranged and distributed near the vicinity of power modules, inductance of the power supply line is reduced, and a high smoothing effect can be obtained with low loss. A surge voltage etc. is also reduced.

The inverter device according to the present invention may further include: two inverter circuits that convert electric power between n-phase AC power and DC power, where n represents a natural number, and the two inverter circuits may be formed by placing, on both sides of the DC bus board, the power modules forming each inverter circuit, as viewed in the direction perpendicular to the board surface of the DC bus board, wherein the smoothing capacitor may be formed by parallel connection of the plurality of capacitor elements, the number of capacitor elements may correspond to that of power modules, and the capacitor elements may be arranged so as to have a positional relation corresponding to that of the power modules. In this case, it is preferable that the inverter device further include: a control board that is placed so as to cover the power modules and the DC bus board as viewed in the direction perpendicular to the board surface of the DC bus board, and that controls the two inverter circuits; and an inverter case that accommodates the DC bus board, the power modules, and the fixing member, and that has at least (n−1) supports supporting and fixing the control board in a central portion of the control board. It is also preferable that the DC bus board of the inverter device have support through holes through which the supports extend, and each support through hole be provided between the phases of the capacitor elements arranged so as to correspond to the power modules that are arranged in line along the one end surface of the DC bus board and that form the n-phase arms.

The control board that is placed so as to cover the power modules and the DC bus board as viewed in the direction perpendicular to the board surface of the DC bus board is a substrate having a relatively large area. This can cause warping, vibration, etc. of the control board, etc. However, the inverter case is provided with the supports that support and fix the control board in the central portion of the control board. This suppresses warping, vibration, etc. of the control board. The DC bus board is placed so as to overlap on the central portion of the control board as viewed in the direction perpendicular to the board surfaces of the control board and the DC bus board. Accordingly, the support through holes through which the supports fixing and supporting the control board extend are formed in the DC bus board. Each support through hole is provided between the phases of the capacitor elements arranged and distributed so as to correspond to the power modules forming the arms of each phase. Accordingly, flexibility in layout of the capacitor elements functioning as the smoothing capacitor is not degraded, and the capacitor elements can be evenly arranged and distributed near the vicinity of each power module. Moreover, warping and vibration of the control board can be satisfactorily suppressed.

MODES FOR CARRYING OUT THE INVENTION

Figure 1:
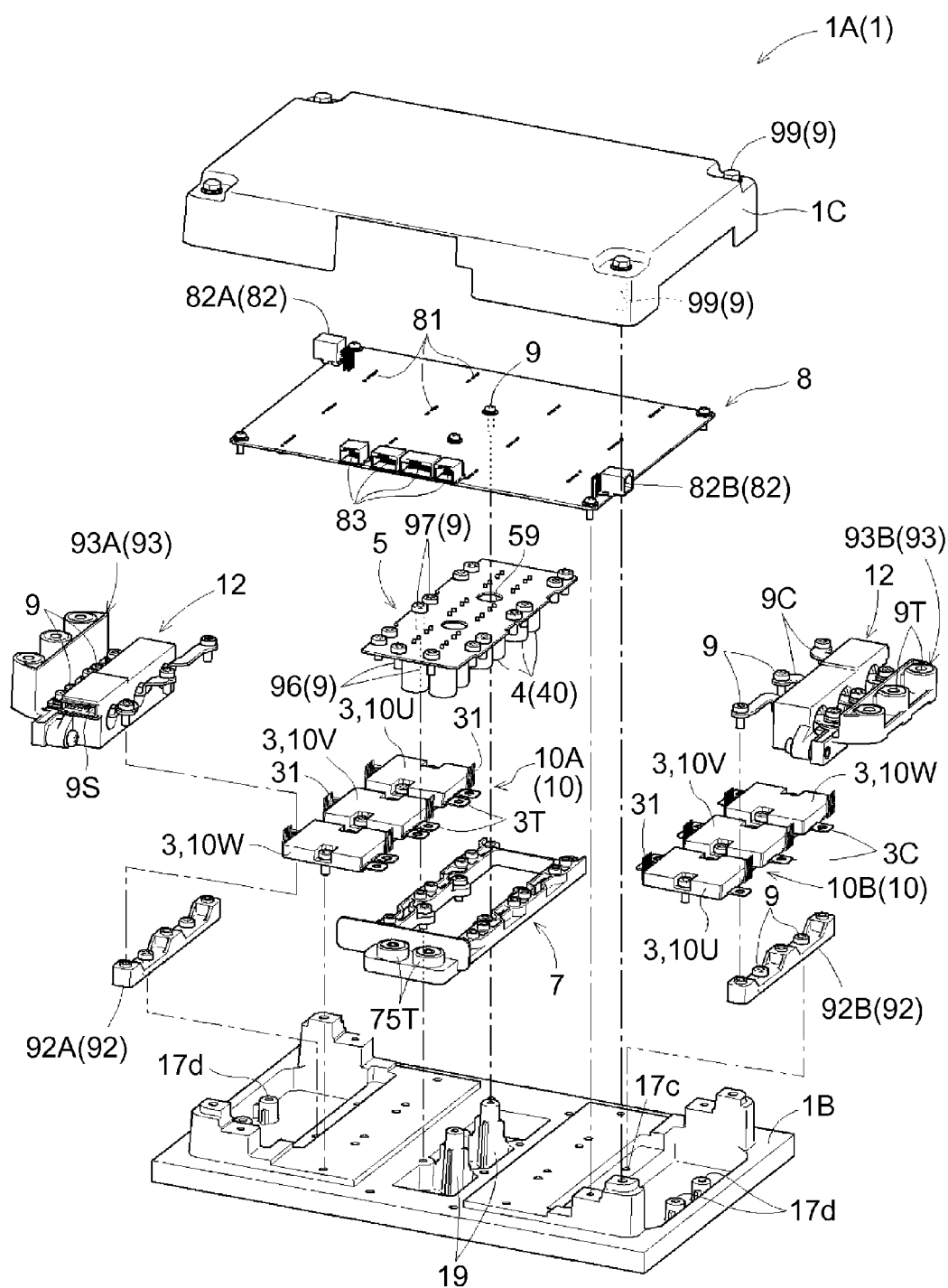
FIG. 1 is an exploded perspective view of an inverter box.
Figure 2:
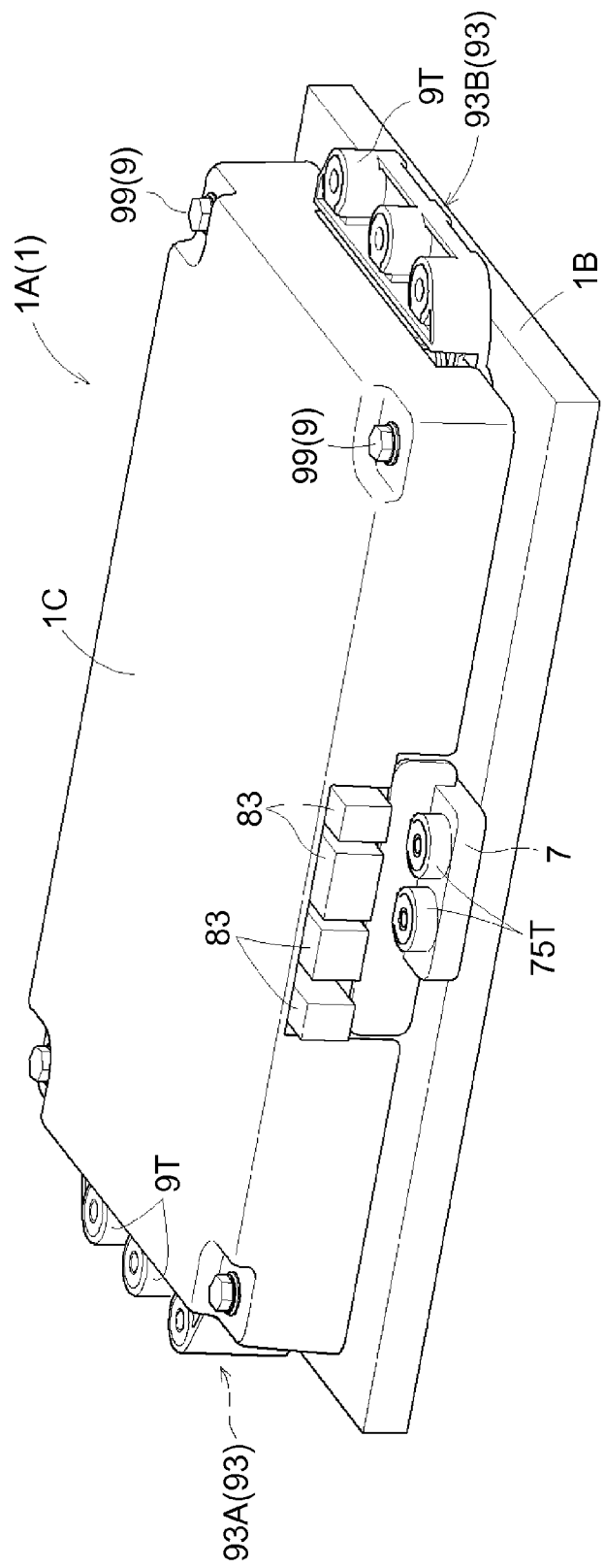
FIG. 2 is a perspective view showing the appearance of the inverter box.

An embodiment of the present invention will be described based on the accompanying drawings with respect to an example in which the present invention is applied to an inverter device that is mounted on a rotating electrical machine drive device for use in hybrid vehicles, electric vehicles, etc. In the present embodiment, as shown in FIGS. 1 and 2, an inverter device 1 is provided in the form of an inverter box 1A containing a circuit board etc. The inverter box 1A has two cases (inverter cases). One of the cases is a base case 1B to which various components forming inverter circuits 10 shown in FIGS. 3 and 4 and a control board 8 controlling the inverter circuits 10 are attached. The other case is a cover case 1C that contacts the base case 1B to enclose the inverter circuits 10 and the control board 8 that are attached to the base case 1B. The inverter box 1A (inverter device 1) is formed by enclosing the circuit board etc. by the base case 1B and the cover case 1C as the inverter cases.

Figure 3:
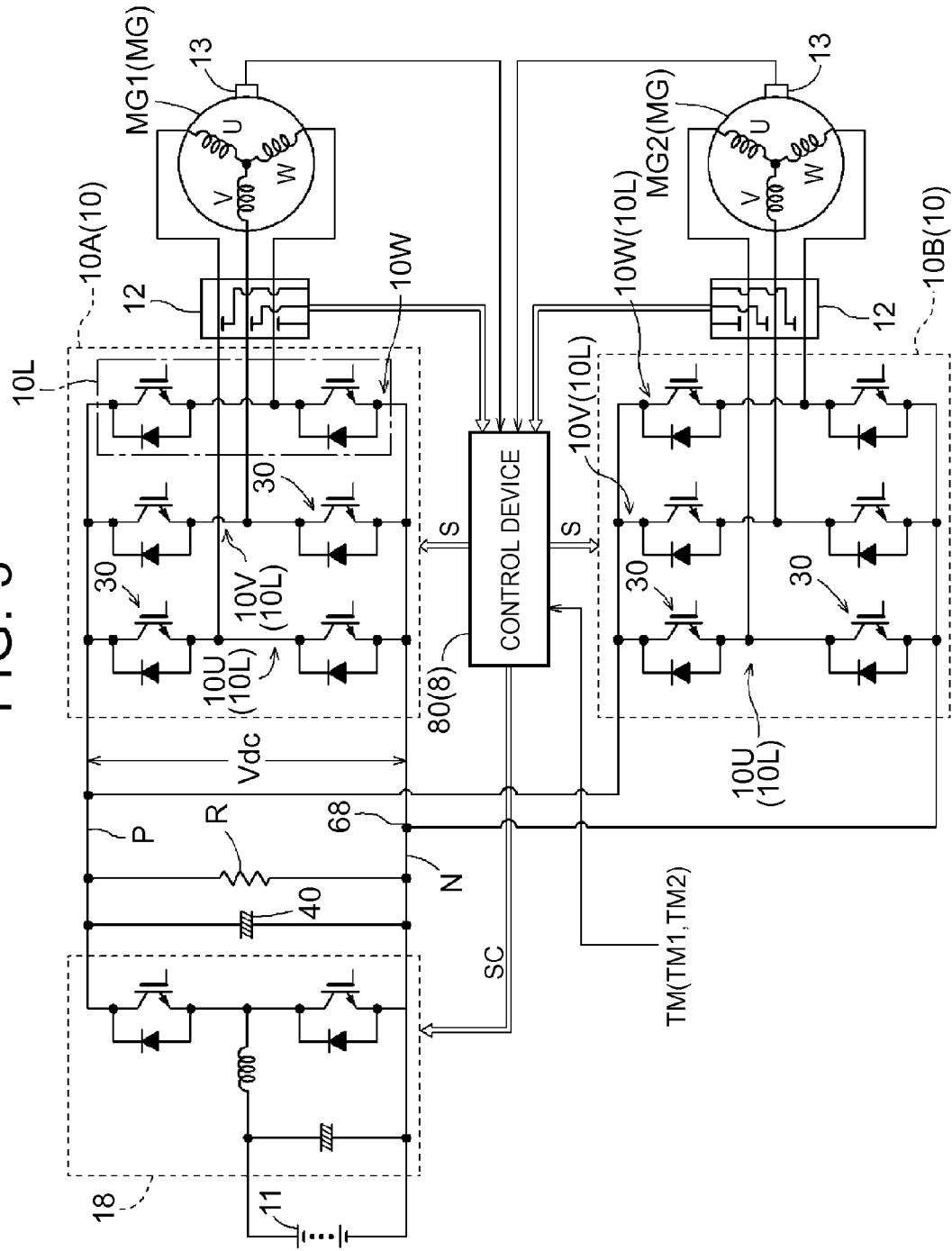
FIG. 3 is a schematic circuit diagram showing the system configuration of a rotating electrical machine drive device.

A vehicle of the present embodiment is, e.g., a 2-motor split type hybrid vehicle or an in-wheel motor type electric vehicle (or hybrid vehicle), and as shown in FIG. 3, has two rotating electrical machines MG (MG1, MG2) mounted thereon. For example, a 2-motor split type hybrid vehicle includes an internal combustion engine and a pair of rotating electrical machines, not shown, as driving force sources. A drive device for this hybrid vehicle includes a power distribution differential gear unit (not shown) that distributes output of the internal combustion engine to one of the rotating electrical machines and to wheels and the other rotating electrical machine. For example, the in-wheel motor type electric vehicle (hybrid vehicle) includes rotating electrical machines as driving force sources in a pair of right and left driving wheels, or includes rotating electrical machines as driving force sources in a power transmission mechanism directly coupled to the driving wheels. Accordingly, in the present embodiment, the inverter box 1A (inverter device 1) is configured as a device that drives the two rotating electrical machines MG (MG1, MG2). These rotating electrical machines MG (MG1, MG2) function as either an electric motor or an electric generator as necessary. That is, these rotating electrical machines MG (MG1, MG2) can perform both power running operation and regenerating operation. These two rotating electrical machines MG (MG1, MG2) are hereinafter simply referred to as the "rotating electrical machines MG" unless they need be identified.

FIG. 3 shows the system configuration of the rotating electrical machine drive device. As shown in FIG. 3, the rotating electrical machine drive device includes two inverter circuits 10, namely a first inverter circuit 10A that drivingly controls one of the rotating electrical machines MG (first rotating electrical machine MG1) and a second inverter circuit 10B that drivingly controls the other rotating electrical machine MG (second rotating electrical machine MG2). The rotating electrical machine drive device further includes a smoothing capacitor 40 that smoothes a system voltage Vdc as a voltage on the DC side of the inverter circuits 10. The inverter circuits 10 (10A, 10B) and the smoothing capacitor 40 are arranged in the inverter box 1A.

As exemplarily shown in FIG. 3, the rotating electrical machine drive device sometimes includes a single common converter circuit 18 for the two inverter circuits 10 (10A, 10B). This converter circuit 18 converts DC power (DC voltage) between the common system voltage Vdc for the two inverter circuits 10 (10A, 10B) and a voltage of a battery 11. In this case, the system voltage Vdc is an output voltage (boost-side output voltage) of the converter circuit 18. If the boost ratio is "1," the output voltage of the converter circuit 18 is substantially equal to the voltage between terminals of the battery 11. In the configuration exemplarily shown in FIG. 3, the battery 11 and the converter circuit 18 function as a "DC power supply" of the inverter device 1. If the rotating electrical machine drive device does not include the converter circuit 18, the battery 11 functions as the "DC power supply." The smoothing capacitor 40 is connected between a positive electrode P and a negative electrode N of the "DC power supply" thus defined, regardless of whether the rotating electrical machine drive circuit includes the converter circuit 18 or not, and smoothes the voltage between the positive and negative electrodes of the "DC power supply" (system voltage Vdc).

The battery 11 can supply electric power to the rotating electrical machines MG (MG1, MG2) via the two inverter circuits 10 (10A, 10B), and can store electric power generated by the rotating electrical machines MG (MG1, MG2) via the two inverter circuits 10 (10A, 10B). For example, various secondary batteries such as a nickel-metal hydride secondary battery and a lithium-ion secondary battery, capacitors, combinations thereof, etc. are used as such a battery 11.

The inverter circuits 10 (10A, 10B) are circuits that convert DC power having the system voltage Vdc to AC power having a plurality of phases (n phases, where n represents a natural number; in this example, three phases), and supply the AC power to the rotating electrical machines MG (MG1, MG2), and that convert AC power generated by the rotating electrical machines MG (MG1, MG2) to DC power and supply the DC power to the DC power supply. These two inverter circuits 10 (10A, 10B) are hereinafter simply referred to as the "inverter circuits 10" unless they need be identified. Each of the inverter circuits 10 has a plurality of switching elements. Insulated gate bipolar transistors (IGBTs) or power metal oxide semiconductor field effect transistors (power MOSFETs) are preferably used as the switching elements. As shown in FIG. 3, in the present embodiment, IGBTs 30 are used as the switching elements.

Figure 4:
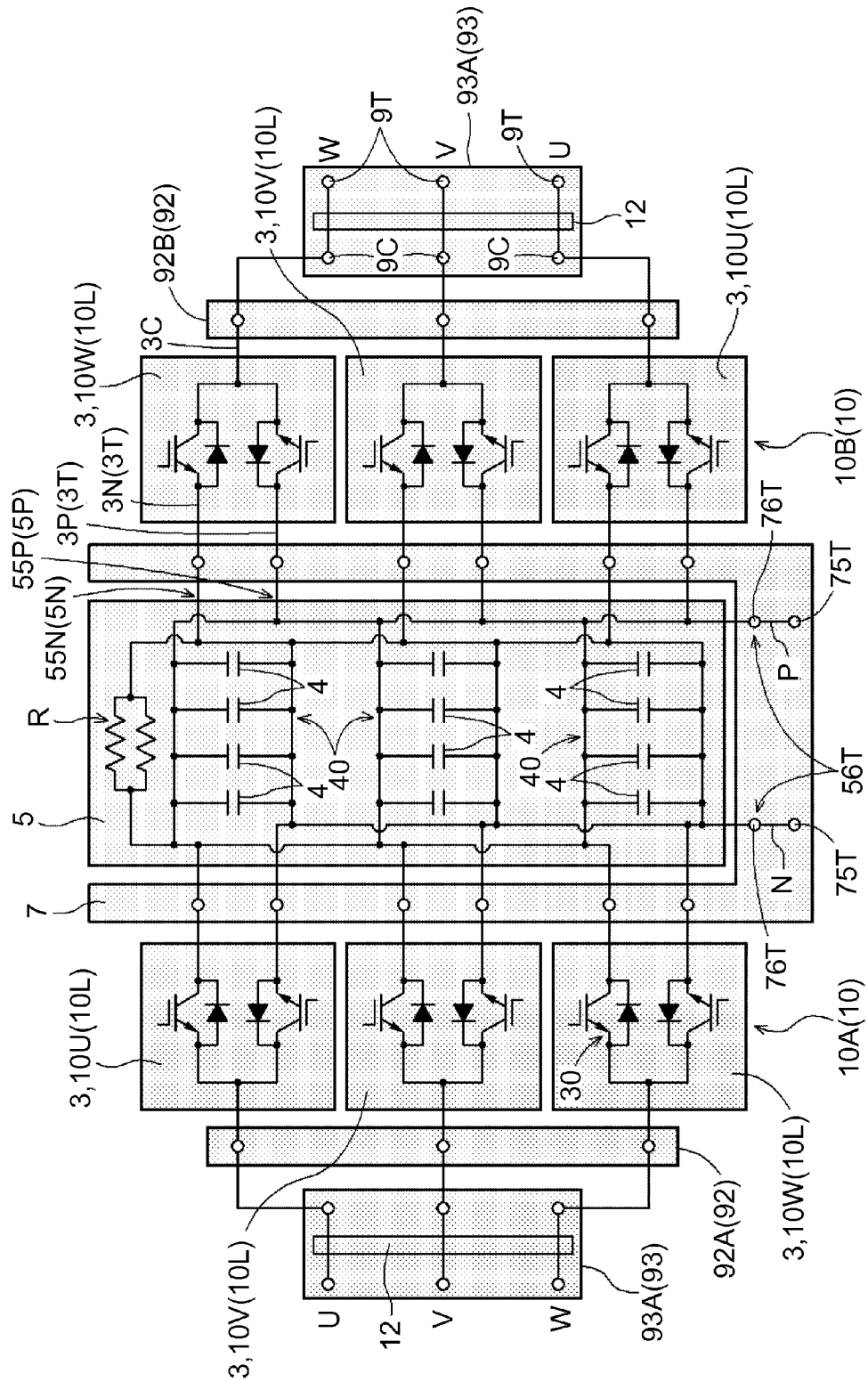
FIG. 4 is a schematic circuit diagram showing the configuration of the inverter box.

For example, each of the inverter circuits 10 that convert electric power between DC power and three-phase AC power is formed by a bridge circuit having three arms corresponding to the three phases as is well known in the art. That is, as shown in FIGS. 3 and 4, two IGBTs 30 are connected in series between the DC positive electrode side (positive electrode P side of the DC power supply) and the DC negative electrode side (negative electrode N side of the DC power supply) of the inverter circuit 10 to form a single arm 10L. Three (three phases: 10U, 10V, 10W) of these series circuits (arms 10L) are connected in parallel. That is, a bridge circuit is formed which has three series circuits (arms 10L) corresponding to stator coils corresponding to U-phase, V-phase, and W-phase of the rotating electrical machine MG. The IGBT 30 in the upper stage of each phase has its collector connected to the positive electrode P of the DC power supply, and has its emitter connected to the collector of the IGBT 30 in the lower stage of that phase. The IGBT 30 in the lower stage of each phase has its emitter connected to the negative electrode N of the DC power supply (e.g., the ground). An intermediate point in the series circuit (arm 10L) of the pair of IGBTs 30 of each phase, i.e., the connection point between the IGBTs 30, is connected to a corresponding one of the stator coils of the rotating electrical machine MG.

Freewheeling diodes (regeneration diodes) are connected in parallel to the IGBTs 30, respectively. Each freewheeling diode is connected in parallel to a corresponding one of the IGBTs 30 such that its cathode terminal is connected to the collector terminal of the IGBT 30 and its anode terminal is connected to the emitter terminal of the IGBT 30.

Figure 5:
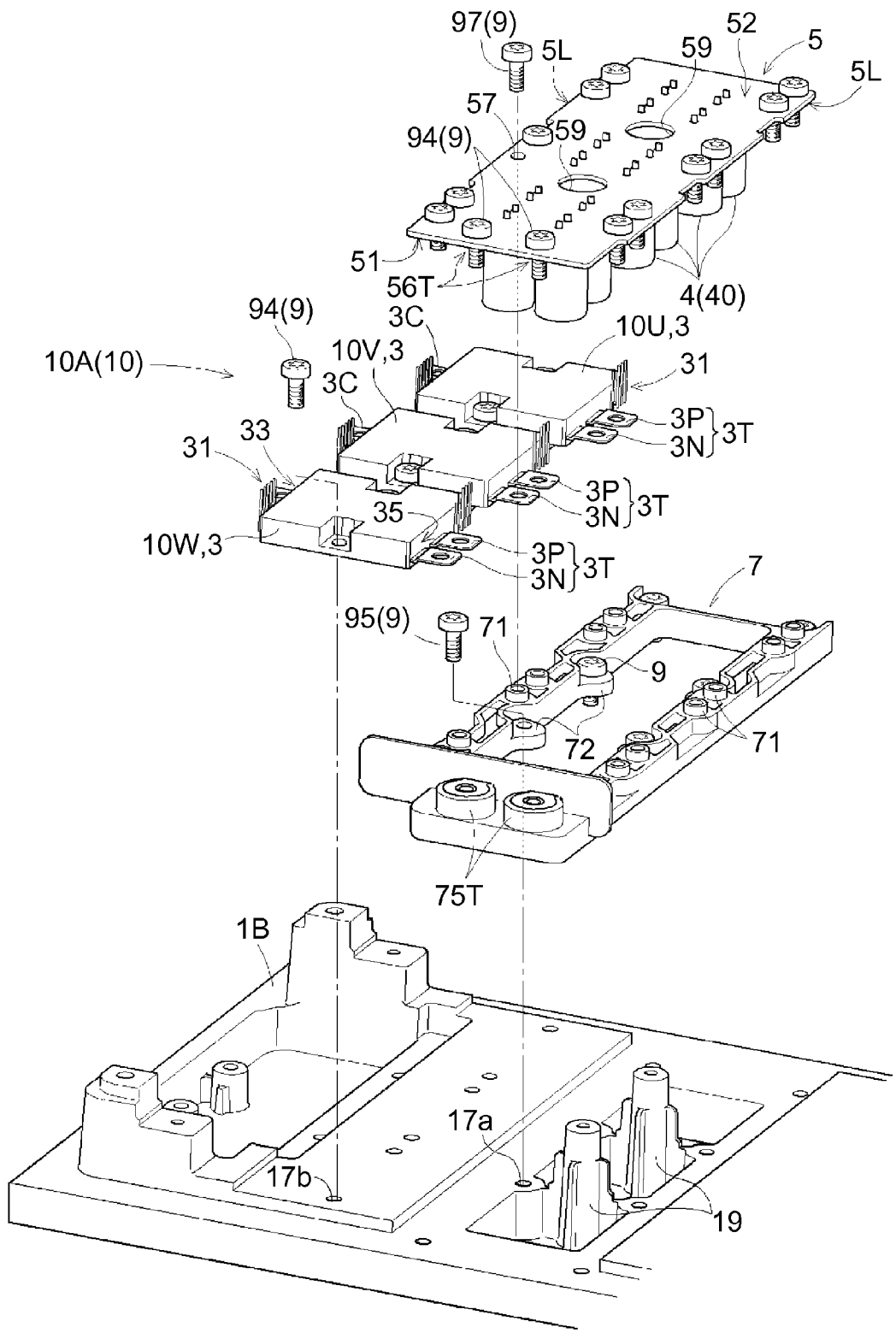
FIG. 5 is a partial enlarged view of the exploded perspective view.

In the present embodiment, as shown in FIG. 4, each arm 10L in which the IGBTs 30 together with the freewheeling diodes are connected in series is formed as a power module 3. As shown in FIGS. 4 and 5, each power module 3 has a positive terminal 3P that is connected to the positive electrode P of the DC power supply, and a negative terminal 3N that is connected to the negative electrode N of the DC power supply. That is, each power module 3 is configured by forming at least one arm 10L that is formed by series connection of at least one IGBT 30 connected to the positive terminal 3P and at least one IGBT 30 connected to the negative terminal 3N. Each inverter circuit 10 that converts electric power between DC power and three-phase AC power is formed by connecting three of the power modules 3 in parallel. As shown in FIG. 5, the positive terminal 3P and the negative terminal 3N are provided as a DC electrode terminal pair 3T protruding from an end 35 on one side of the power module 3.

As shown in FIG. 3, the inverter circuits 10 are controlled by a control device 80. The control device 80 has an electronic control unit (ECU) and a driver circuit. Part of or all of circuits forming the control device 80 are formed on the control board 8 (see FIG. 1). The ECU that is mounted on the control device 80 is configured by using a logic circuit such as a microcomputer as a core member. In the present embodiment, the ECU controls the rotating electrical machines MG via the inverter circuits 10 by performing current feedback control by using a vector control method. The ECU has various function units for the current feedback control, and each function unit is implemented by cooperation between hardware such as the microcomputer and software (program).

The IGBTs 30 forming each inverter circuit 10 have their gates connected to the ECU via the driver circuit, and are individually switched on/off. Typically, the operating voltage (power supply voltage of a circuit) significantly varies between a power electric circuit that drives the rotating electrical machine MG and an electronic circuit such as the ECU using the microcomputer as a core. Accordingly, a control signal for the IGBT 30 which is generated by the ECU operating at a relatively low voltage is supplied via the driver circuit to the inverter circuit 10 as a high-voltage gate drive signal S. In the case where the converter circuit 18 is mounted on the rotating electrical machine drive device, a high-voltage converter gate drive signal SC is similarly supplied from the control device 80 to the converter circuit 18 via the driver circuit.

An actual current flowing in the stator coils of each phase of the rotating electrical machine MG is detected by a current sensor 12, and the control device 80 obtains the detection result. FIG. 3 schematically shows a form in which a non-contact type current sensor 12 that is placed near bus bars etc. to detect a current in a non-contact manner detects an actual current of each of the three phases. The current sensor 12 is fixed to a third terminal block 93 described below (see FIGS. 1 and 4), and detects a current flowing in the bus bars extending in the third terminal block 93. As shown in FIG. 1, a current detection result output connector 9S is provided on the third terminal block 93, and is connected to a current detection result input connector 82 of the control board 8 by a cable, not shown, etc. The present embodiment shows a configuration in which currents of all the three phases are detected. However, the three phases are in an equilibrium state, and the sum of instantaneous values of the currents is zero. Accordingly, currents of only two phases may be detected by the current sensor 12, and a current of the remaining one phase may be obtained by computation in the control device 80.

The magnetic pole position of a rotor of the rotating electrical machine MG at each time is detected by a rotation sensor 13, and the control device 80 obtains the detection result. The rotation sensor 13 is formed by, e.g., a resolver etc. The magnetic pole position represents a rotation angle of the rotor in an electrical angle. As shown in FIG. 3, the rotation sensor 13 is placed near the rotating electrical machine MG. The detection result of the rotation sensor 13 is therefore transmitted to the control device 80 via a cable, not shown, etc. When the ECU that uses the detection result of the rotation sensor 13 is formed on the control board 8, the detection result of the rotation sensor 13 is transmitted to the control device 80 via an external connector 83 that is placed on the control board 8 in order to send and receive signals to and from the outside of the inverter box 1A. Target torque TM (TM1, TM2) of the rotating electrical machine MG which is provided to the control device 80 as a request signal from other control device such as a vehicle control device, not shown, is also transmitted via the external connector 83.

As shown in FIG. 1, the control board 8 forming the control device 80 has signal transmission through holes 81 (signal transmission terminal receiving portions) that send and receive signals including the gate drive signal S to and from the power modules 3. In the state where the power modules 3 and the control board 8 are attached to the base case 1B, signal transmission pins 31 (signal transmission terminals) of the power modules 3 extend through the signal transmission through holes 81. The signal transmission pins 31 are soldered to the signal transmission through holes 81, whereby signals can be sent between the control board 8 and each power module 3. The signals that are sent between the control board 8 and each power module 3 include a fault diagnosis signal, a temperature detection signal, etc. from the power module 3 to the control board 8 in addition to the gate drive signal S described above.

As shown in the exploded perspective view of FIG. 1, the inverter box 1A is formed by attaching the power modules 3, a DC bus board 5 having the smoothing capacitor 40 mounted thereon, terminal blocks including a first terminal block 7 (fixing member) (second terminal block 92 and third terminal block 93), and the control board 8 to the base case 1B, and attaching the cover case 1C to the base case 1B so as to enclose these components. The DC bus board 5 and the first terminal block 7 (fixing member) are common members for the two inverter circuits 10 (10A, 10B). The second terminal block 92 and the third terminal block 93 are provided for each of the first rotating electrical machine MG1 (first inverter circuit 10A) and the second rotating electrical machine MG2 (second inverter circuit 10B). That is, a first-rotating-electrical-machine second terminal block 92A and a first-rotating-electrical-machine third terminal block 93A are provided for the first rotating electrical machine MG1, and a second-rotating-electrical-machine second terminal block 92B and a second-rotating-electrical-machine third terminal block 93B are provided for the second rotating electrical machine MG2.

As described above, the current sensor 12 is fixed to the third terminal block 93. The detection result of the current detected in the first-rotating-electrical-machine third terminal block 93A is transmitted to the control device 80 via a cable etc., not shown, which connects the current detection result output connector 9S and a first-rotating-electrical-machine current detection result input connector 82A of the control board 8. Similarly, the detection result of the current detected in the second-rotating-electrical-machine third terminal block 93B is transmitted to the control device 80 via a cable etc., not shown, which connects the current detection result output connector 9S and a second-rotating-electrical-machine current detection result input connector 82B of the control board 8.

As shown in FIG. 5, the first terminal block 7 has threaded holes 71 that receive fastening members 97 (9) extending through fastening member through holes 57 formed in the DC bus board 5 and through holes formed in the DC electrode terminal pairs 3T of the power modules 3. The base case 1B has threaded holes 17a that receive fastening members 95 (9) extending through holes 72 formed in the first terminal block 7. In this manner, the DC bus board 5 and the power modules 3 are fastened to the first terminal block 7 by the common fastening members 9, and the first terminal block 7 is fixed to the base case 1B. The first terminal block 7 functions as a fixing member that maintains a relative positional relation between the DC bus board 5 and the plurality of power modules 3 provided corresponding to the arms 10L corresponding to the plurality of phases of the alternating current.

Figure 6:
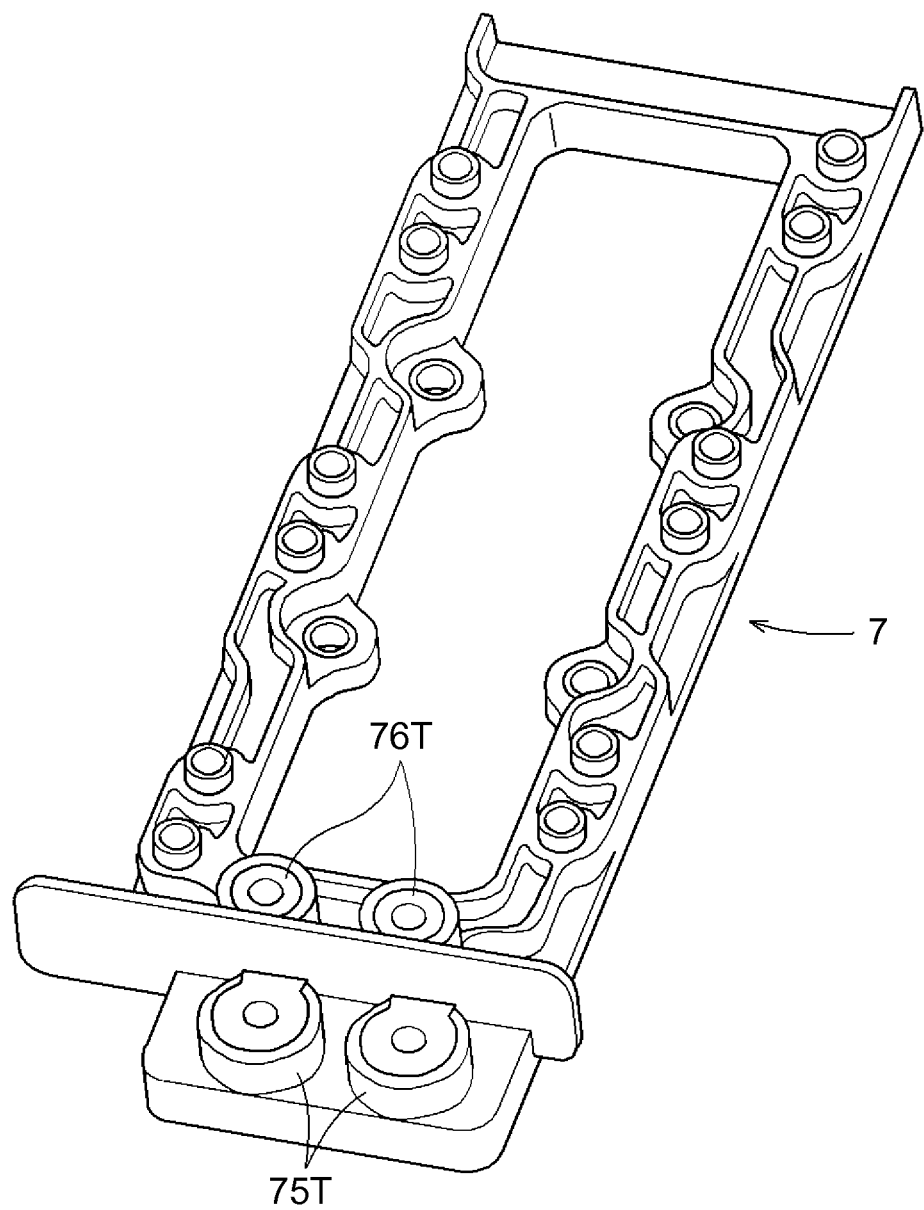
FIG. 6 is a perspective view of a fixing member.

In addition to terminal pairs (pairs of "55P" and "55N" described below based on FIG. 7) that contact the DC electrode terminal pairs 3T of the power modules 3 so as to be electrically connected thereto, a DC electrode pattern connection terminal pair 56T (see FIGS. 5 and 7) connected to the DC power supply are formed on a first board surface 51 of the DC bus board 5. The DC electrode pattern connection terminal pair 56T are connected to a DC bus board connection terminal pair 76T formed on the first terminal block 7 as shown in FIG. 6 as a perspective view as viewed from a different direction from FIGS. 1 and 5. That is, the DC bus board 5 is fastened to the base case 1B by fastening members 96 (9) as shown in FIG. 5 such that the DC electrode pattern connection terminal pair 56T of the DC bus board 5 contact the DC bus board connection terminal pair 76T of the first terminal block 7. As shown in FIG. 6, the first terminal block 7 includes a DC power supply connection terminal pair 75T that are electrically connected to the DC bus board connection terminal pair 76T. The DC power supply connection terminal pair 75T are terminals that are connected to the positive electrode P and the negative electrode N of the DC power supply such as the battery 11 placed outside the inverter box 1A. As shown in FIG. 2, the DC power supply connection terminal pair 75T are placed outside the inverter box 1A even in the state where the cover case 1C is attached to the base case 1B. The DC power supply connection terminal pair 75T can thus be easily connected to the DC power supply.

Figure 7:
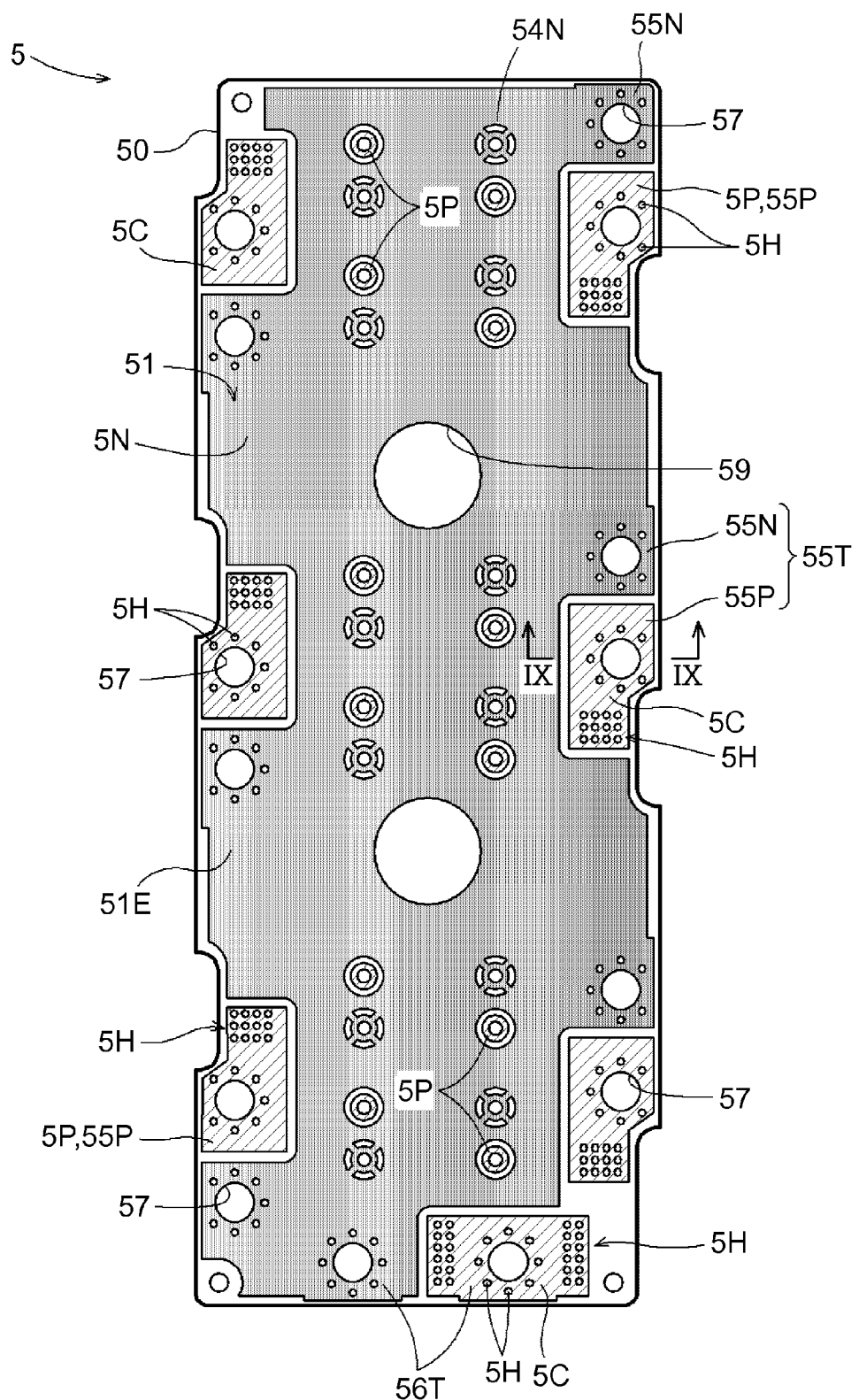
FIG. 7 is a diagram showing an electrode pattern on a component mount surface of a DC bus board.
Figure 8:
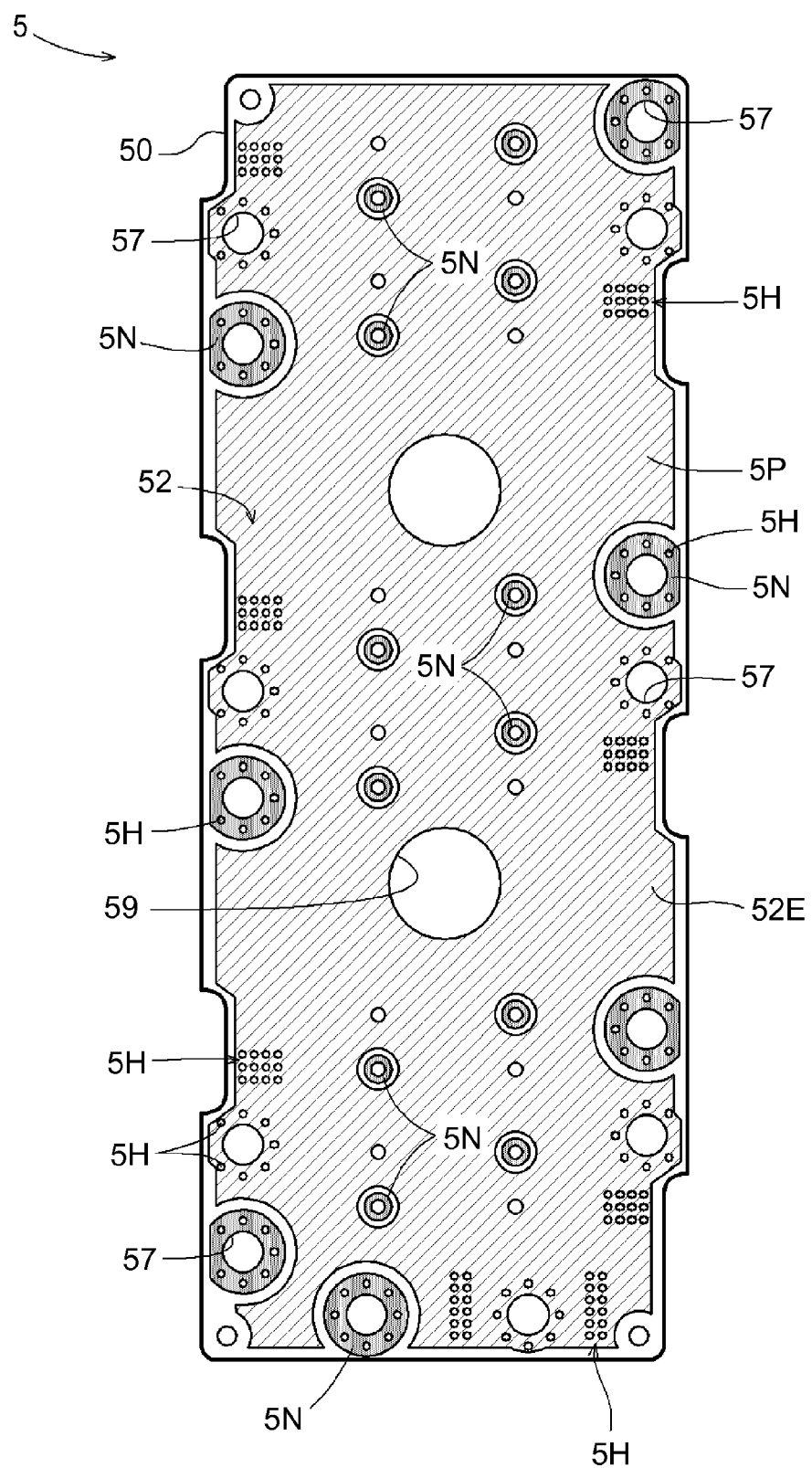
FIG. 8 is a diagram showing an electrode pattern on a soldering surface of the DC bus board.
Figure 9:
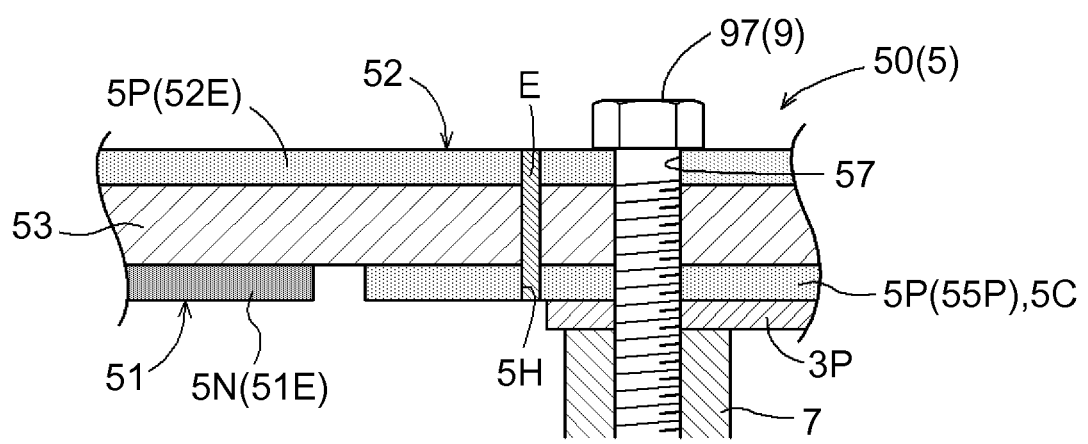
FIG. 9 is a partial sectional view of a connection terminal surface and a region near conducting through holes of the DC bus board.

As shown in FIGS. 7 to 9, a first electrode pattern 51E as one of a positive electrode pattern 5P and a negative electrode pattern 5N is formed on the first board surface 51 of the DC bus board 5 which is one of the surfaces of an insulating layer 53 forming a substrate 50, and a second electrode pattern 52E as the other of the positive electrode pattern 5P and the negative electrode pattern 5N is formed on a second board surface 52 of the DC bus board 5 which is the other surface of the insulating layer 53. In the example shown in FIGS. 7 to 9, the negative electrode pattern 5N is formed as the first electrode pattern 51E on the first board surface 51, and the positive electrode pattern 5P is formed as the second electrode pattern 52E on the second board surface 52. The electrode patterns of different polarities are formed on the board surfaces. These electrode patterns thus make a DC current flow in opposite directions on these board surfaces. Electromagnetic induction is thus cancelled and mutual inductance increases. This suppresses a surge voltage and reduces loss.

The positive electrode pattern 5P and the negative electrode pattern 5N in which a large current flows have a larger thickness than an electrode layer on a normal printed board, and preferably have a thickness of, e.g., about 300 to 600 [μm]. The electrode pattern diagrams of FIGS. 7 and 8 are diagrams as viewed in the same direction, and one of the electrode pattern diagrams is a front view, and the other is a transparent view. Specifically, FIG. 8 is a diagram of the DC bus board 5 as directly viewed from the second board surface 52 (the soldering surface described below) side (a front view of the second board surface 52), and FIG. 7 is a diagram of the first board surface 51 of the DC bus board 5 as transparently viewed from the second board surface 52 side (a transparent view of the first board surface 51).

As shown in FIG. 7, each terminal of the DC bus board 5, specifically the connection positive terminals 55P, the connection negative terminals 55N, and the DC electrode pattern connection terminal pair 56T are formed on the first board surface 51 of the DC bus board 5. The DC bus board 5 is fixed to the first terminal block 7 by the fastening members 9 such that the first board surface 51 contacts terminals provided on other members such as the power modules 3 and the first terminal block 7. In other words, the DC bus board 5 is fastened to the base case 1B via the first terminal block 7 by the fastening members 9 such that the terminals provided on the first board surface 51 contact the terminals provided on other members.

Since the surface that contacts the terminals provided on other members is the first board surface 51, the positive electrode pattern 5P formed as the second electrode pattern 52E on the second board surface 52 need be partially formed on the first board surface 51. That is, the terminals (connection positive terminals 55P) that are electrically connected to the second electrode pattern 52E (positive electrode pattern 5P) are formed on the first board surface 51. As shown in FIGS. 7 and 9, each of these terminals (connection positive terminals 55P) includes a connection terminal surface 5C formed on the first board surface 51 so as to be separated from the first electrode pattern 51E (negative electrode pattern 5N), and conducting through holes 5H extending through the insulating layer 53. The conducting through holes 5H are formed separately from the fastening member through hole 57 in the connection positive terminal 55P through which the fastening member 9 extends. Each conducting through hole 5H has a conductive material E on its inner wall, and the second electrode pattern 52E (positive electrode pattern 5P) is electrically connected to the connection terminal surface 5C by the conductive material E. FIG. 9 shows a section taken along line IX-IX in FIG. 7 in the state where the DC bus board 5 together with the power modules 3 is fixed to the first terminal block 7 by the fastening members 9 (97).

In general, electrodes other than the connection positive terminals 55P, the connection negative terminals 55N, and the DC electrode pattern connection terminal pair 56T are insulated by coating the board surfaces with resist etc. However, the conducting through holes 5H are not subjected to an insulation treatment so that the conducting through holes 5H can be filled with solder in a flow process described below. Filling the conducting through holes 5H with solder increases a sectional area of electrical connection, and can reduce impedance between the first board surface 51 and the second board surface 52.

Bolts made of a conductive metal such as iron, etc. are often used as the fastening members 9. Accordingly, when a current flows between the first board surface 51 and the second board surface 52 of the DC bus board 5, the current also flows in the fastening members 9, which may increase the temperature of the terminals (DC electrode terminal pairs 3T) of the power modules 3 and the peripheries thereof due to the heat generated by the fastening members 9. In the case where the conducting through holes 5H having the conductive material E on their inner walls are provided separately from the fastening member through holes 57 as described above, most of the current flows between the first board surface 51 and the second board surface 52 of the DC bus board 5 via the conducting through holes 5H having lower impedance. This suppresses the current that flows in the fastening members 9, and can suppress heat generation of the fastening members 9. Providing the conducting through holes 5H in this manner allows non-conductive members (made of a resin etc.) to be used as the fastening members 9. Accordingly, flexibility in selection of components is improved. The members made of a resin are typically lighter than members made of iron, and thus contribute to reduction in weight of the inverter box 1A.

The conductive material E may be provided on the inner walls of the fastening member through holes 57 by plating etc., or the conductive material E may not be provided on the inner walls of the fastening member through holes 57. In the form exemplarily shown in FIG. 9, the conductive material E is not provided on the inner walls of the fastening member through holes 57. Although FIGS. 7 to 9 show an example in which the negative electrode pattern 5N is formed as the first electrode pattern 51E on the first board surface 51 and the positive electrode pattern 5P is formed as the second electrode pattern 52E on the second board surface 52, the positive electrode pattern 5P may be formed as the first electrode pattern 51E and the negative electrode pattern 5N may be formed as the second electrode pattern 52E.

As shown in FIGS. 1, 4, 5 etc., the smoothing capacitor 40 is formed by parallel connection of a plurality of capacitor elements 4. The number of capacitor elements 4 corresponds to that of power modules 3, and the capacitor elements 4 are arranged and distributed so as to have a positional relation corresponding to that of the power modules 3. As shown in FIG. 1, the power modules 3 are placed on both sides of the smoothing capacitor 40 (capacitor element group) as viewed in a direction perpendicular to the board surface of the DC bus board 5. Specifically, the plurality of power modules 3 provided corresponding to the arms 10L corresponding to the plurality of phases of the alternating current are arranged in line along one end surface 5L of the DC bus board 5. In the present embodiment, since the two inverter circuits 10 (10A, 10B) are formed, the power modules 3 are arranged in line along each of opposing two end surfaces 5L. The number of capacitor elements 4 corresponds to the number of power modules 3. For example, one or more capacitor elements 4 are provided for each power module 3. That is, the number of capacitor elements 4 is the same as that of power modules 3, or is equal to the number of power modules 3 multiplied by a natural number. The capacitor elements 4 are arranged so as to have a positional relation corresponding to that of the power modules 3. For example, the capacitor elements 4 are placed near each power module 3.

Specifically, in each power module connection terminal pair 55T as a pair of connection positive terminal 55P and connection negative terminal 55N, the capacitor element 4 is placed so as to have such an arrangement distance (capacitor arrangement distance) that the distance between the capacitor element 4 and the connection positive terminal 55P is equal to (substantially the same as) that between the capacitor element 4 and the connection negative terminal 55N. The capacitor elements 4 are arranged and distributed so that the capacitor arrangement distances for all the power modules 3 are equal to each other (substantially the same). In the case where a plurality of capacitor elements 4 are allocated to each power module 3 (to each power module connection terminal pair 55T), the distances to the connection positive terminal 55P and the distances to the connection negative terminal 55N are preferably average values. If the capacitor elements 4 are arranged in this manner, the capacitor elements 4 are located near each power module 3 as a result. This reduces the impedance (especially an inductance component) of each power module 3 (each arm 10L) to the DC power supply, and can satisfactorily suppress a surge voltage that is generated by switching of the IGBTs 30.

A discharge resistor R (see FIG. 4) is often provided parallel to the smoothing capacitor 40 in order to discharge the remaining charge upon shutdown of the rotating electrical machine drive device. This discharge resistor R can also be mounted on the DC bus board 5. The discharge resistor R and its fixing mechanism need not be placed at other positions in the inverter box 1A, and reduction in size can be implemented. As described above, the DC electrode pattern connection terminal pair 56T that is electrically connected to the DC bus board connection terminal pair 76T electrically connected to the DC power supply connection terminal pair 75T electrically connected to the external DC power supply is formed on the DC bus board 5. The discharge resistor R is preferably placed near the DC electrode pattern connection terminal pair 56, e.g., so as to adjoin this terminal pair. The discharge resistor R can also be formed by parallel connection of a plurality of smaller resistive elements (not shown) having small current capacity.

The first board surface 51 of the DC bus board 5 is a component surface on which the plurality of capacitor elements 4 and the resistive elements are mounted. The example shown in FIGS. 7 and 8 shows a form in which only the capacitor elements 4 are mounted thereon. For example, the capacitor elements 4 are electric field capacitors. In the present embodiment, the capacitor elements 4 are radial discrete components. In this case, although the capacitor elements 4 are mounted on the first board surface 51 as a component surface, lead wires functioning as terminals of the capacitor elements 4 extend to the second board surface 52 side through holes formed in the DC bus board 5. The lead wires of the capacitor elements 4 are soldered to the second board surface 52. The second board surface 52 is therefore a soldering surface on which soldering is performed.

This soldering is often performed by a flow process in which the DC bus board 5 is moved so that the soldering surface extends along the liquid surface of a solder bath filed with molten solder. The lead wires of the capacitor elements 4 mounted on the component surface protrude beyond the soldering surface via the through holes. The lead wires protruding beyond the soldering surface are soldered to lands (conductive material E) formed around the through holes and the conductive material E formed on the inner walls of the through holes. At this time, no solder adheres to the conductive material E (the lands, the through holes, etc.) insulated by resist etc. As described above, the conducting through holes 5H are not subjected to an insulation treatment such as a resist treatment, so that solder can be guided toward the first board surface 51 (component surface) via the conducting through holes 5H by using capillarity in the flow process and the conducting through holes 5H can be filled with solder.

The through holes in which the lead wires of the capacitor elements 4 are inserted are also not subjected to an insulation treatment such as a resist treatment, and therefore solder is guided toward the first board surface 51 by capillarity via the through holes and the lead wires. In the case where an appropriate amount of solder is guided to the first board surface 51, the lead wires are soldered to both surfaces of the DC bus board 5. Accordingly, mechanical connection is obtained, and electrically reliable mounting is implemented. The lead wire connection lands (electrode pattern) that are formed in the first electrode pattern 51E (negative electrode pattern 5N) on the first board surface 51 have a large area as they are, solder may be solidified before reaching the first board surface 51 because heat dissipates. Accordingly, solder may not sufficiently move up to the first board surface 51. It is therefore preferable that these lands be shaped so that the conductive material E is partially omitted, as shown by reference character "54N" in FIG. 7.

In the flow process, the DC bus board 5 is brought into contact with molten solder having a temperature of 200° C. or higher, and therefore the temperature of the DC bus board 5 also increases. If the capacitor elements 4 are electric field capacitors, their outer casings (sleeves) may partially melt, and their insulation properties may be degraded. In the form in which the negative electrode pattern 5N is formed on the component surface (first board surface 51), the polarity (negative electrode N) of the sleeves is the same as that of the negative electrode pattern 5N. Accordingly, reliability is not reduced even if the insulation properties are degraded.

As shown in FIGS. 7 and 8, the DC bus board 5 has the connection positive terminals 55P that are electrically connected to the positive electrode pattern 5P and the connection negative terminals 55N that are electrically connected to the negative electrode pattern 5N. The connection positive terminal 55P is a terminal that is to be electrically connected to the positive terminal 3P of the power module 3 when the inverter box 1A is assembled as shown in FIGS. 1 and 5. Similarly, the connection negative terminal 55N is a terminal that is to be electrically connected to the negative terminal 3N of the power module 3. Namely, the DC bus board 5 has a plurality of connection positive terminals 55N that are electrically connected to the positive electrode pattern 5P and that are respectively electrically connected to the positive terminals 3P of the plurality of power modules 3, and a plurality of connection negative terminals 55N that are electrically connected to the negative electrode pattern 5N and that are respectively electrically connected to the negative terminals 3N of the plurality of power modules 3.

The connection positive terminal 55N and the positive terminal 3P which correspond to each other are fastened to the first terminal block 7 (fixing member) by a common fastening member 97 (9), and the connection negative terminal 55N and the negative terminal 3N which correspond to each other are fastened to the first terminal block 7 (fixing member) by a common fastening member 97 (9), so that the DC bus board 5 and the power modules 3 are fixed to the first terminal block 7 (fixing member). Specifically, the connection positive terminals 55P of the DC bus board 5 and the positive terminals 3P of the power modules 3 are fastened to the first terminal block 7 (fixing member) by the common fastening members 97 (9). Similarly, the connection negative terminals 55N of the DC bus board 5 and the negative terminals 3N of the power modules 3 are fastened to the first terminal block 7 (fixing member) by the common fastening members 97 (9). The DC bus board 5 and the power modules 3 are thus fixed to the first terminal block 7 (fixing member). The positive terminal 3P and the negative terminal 3N of each power module 3 are provided as a DC electrode terminal pair 3T protruding from the end 35 on one side of the power module 3. Each power module 3 is fixed such that the end 35 on one side faces the first terminal block 7 (fixing member).

The DC electrode pattern connection terminal pair 56T formed on the DC bus board 5 is fastened to the first terminal block 7 by the fastening members 96 (9) so as to be in contact with the DC bus board connection terminal pair 76T of the first terminal block 7. As shown in FIGS. 1 and 5, if each power module 3 is directly fixed to the base case 1B by a fastening member 94 (9), the power module 3 is fixed more firmly. Since each power module 3 can be made to more closely contact the base case 1B, the power module 3 can be cooled via the base case 1B. For example, it is preferable that the base case 1B have cooling fins on the surface opposite to the surface that contacts the power modules 3. The power modules 3 can be satisfactorily cooled by using the base case 1B as a heat sink.

As shown in FIGS. 1, 3, and 4, the inverter box 1A of the present embodiment has two inverter circuits 10 (10A, 10B) that convert electric power between three-phase AC power and DC power. The inverter box 1A is formed by placing the power modules 3 of the inverter circuits 10 (10A, 10B) on respective sides of the DC bus board 5 as viewed in the direction perpendicular to the board surface of the DC bus board 5. The control board 8 on which part of or all of the circuits of the control device 80 controlling the two inverter circuits 10 (10A, 10B) are formed is placed so as to cover the power modules 3 and the DC bus board 5 as viewed in the direction perpendicular to the board surface of the DC bus board 5. The control board 8 is therefore a substrate having a relatively large area, and is preferably sufficiently fixed so as to suppress warping, vibration, etc.

Accordingly, the base case 1B (inverter case) that accommodates the DC bus board 5, the power modules 3, and the first terminal block 7 (fixing member) has a support 19 that supports and fixes the control board 8 in the central portion of the control board 8. The DC bus board 5 that is to be located on the central portion of the control board 8 in the assembled state of the inverter box 1A as viewed in the direction perpendicular to the board surface has a support through hole 59 through which the support 19 extends. The support through hole 59 is provided between the phases of the capacitor elements arranged so as to correspond to the power modules 3 that are arranged in line along one end surface 5L of the DC bus board 5 and that form the n-phase arms 10L (10U, 10V, 10V). In the example shown in FIGS. 1, 5, etc., the support through hole 59 is formed at two positions that are located between the phases of the capacitor elements 4 that are arranged and distributed at three positions so as to correspond to the three power modules 3 of the inverter circuit 10 that converts electric power between three-phase AC power and DC power. The two supports 19 that are provided in the base case 1B are formed so as to correspond to the support through holes 59 formed at the two positions.

It is efficient to provide the two supports 19 in this manner for the inverter circuit 10 that converts electric power between three-phase AC power and DC power. For example, in the case where the inverter circuit 10 is a circuit that converts electric power between n-phase AC power and DC power, where n represents a natural number, it is preferable to form (n−1) supports 19 in the base case 1B. In this case, it is preferable that the DC bus board 5 have the support through hole 59 at (n−1) positions each located between the phases of the capacitor elements 4 arranged and distributed so as to correspond to the power modules 3 that are arranged in line along one end surface 5L of the DC bus board 5 and that form the n-phase arms 10L. Providing the support though holes 59 in the DC bus board 5 eliminates the need to provide a separate fixing support structure for the control board 8, and can reduce the size of the inverter box 1A.

As described above, the DC electrode terminal pairs 3T are provided so as to protrude from the ends 35 on one side of the power modules 3. AC electrode terminals 3C corresponding to the arms 10L (10U, 10V, 10W) are provided so as to protrude from ends 33 located on the opposite side to the ends 35 on one side (see FIGS. 1 and 5). Each second terminal block 92 has three fixing portions in order to fix all of the three-phase AC electrode terminals 3C. Each third terminal block 93 has three-phase AC relay terminals 9C that are connected to all of the three-phase AC electrode terminals 3C. The AC electrode terminals 3C of the power modules 3 are fastened to the AC relay terminals 9C of the third terminal block 93 and the second terminal block 92 by common fastening members 9. Each second terminal block 92 is fastened and fixed to threaded holes 17c formed in the base case 1B by the fastening members 9, and each third terminal block 93 is fastened and fixed to threaded holes 17d formed in the base case 1B by fastening members 9.

As shown in FIG. 1, each third terminal block 93 includes three AC output terminals 9T corresponding to the three-phase AC relay terminals 9C. The AC relay terminal 9C and the AC output terminal 9T of each phase are connected by the bus bar extending through the third terminal block 93. Each third terminal block 93 is provided with the current sensor 12 that detects a current in the bus bars in a non-contact manner, as described above. As shown in FIG. 2, the AC output terminals 9T are located outside the inverter box 1A even in the state where the cover case 1C is attached to the base case 1B. This allows the AC output terminals 9T to be satisfactorily connected to the stator coils of each phase of each rotating electrical machine MG.

After the first terminal block 7, the second terminal blocks 92, the power modules 3, the DC bus board 5, and the third terminal blocks 93 are fixed to the base case 1B, the control board 8 is fixed to the base case 1B by fastening members 9 so as to cover these components. At this time, as described above, the signal transmission pins 31 of the power modules 3 extend through the signal transmission through holes 81 of the control board 8. The signal transmission pins 31 are soldered to the signal transmission through holes 81. Once all the members including cables connecting the third terminal blocks 93 to the control board 8, etc. are attached to the base case 1B, the cover case 1C is fastened to the base case 1B by fastening members 99 (9), whereby the inverter box 1A is formed.

Other Embodiments

Other embodiments of the present invention will be described below. The configuration of each embodiment described below may not only be used by itself, but also be combined with any of the configurations of the other embodiments unless inconsistency arises.

(1) The above embodiment is described with respect to the form in which two inverter circuits 10 (10A, 10B) are provided to control two rotating electrical machines MG. However, the inverter box 1A (inverter device 1) may include a single inverter circuit 10 or may include three or more inverter circuits 10. That is, any number of inverter circuits 10 may be provided as long as the DC bus board 5 and the power modules 3 are fixed to the first terminal block 7 by fastening the connection positive terminals 55P of the DC bus board 5 and the positive terminals 3P of the power modules 3 to the first terminal block 7 (fixing member) by the common fastening members 9 and fastening the connection negative terminals 55N of the DC bus board 5 and the negative terminals 3N of the power modules 3 to the first terminal block 7 by the common fastening members 9.

(2) In the case where the DC bus board 5 and the power modules 3 are connected such that the power modules 3 face the end surface 5L of the DC bus board 5, it is preferable that the positive terminal 3P and the negative terminal 3N of each power module 3 be provided as a DC electrode terminal pair 3T protruding from the end 35 on one side of the power module 3, as described above. However, the manner in which the DC bus board 5 and the power modules 3 are connected is not limited to this form. For example, the DC bus board 5 and the power modules 3 may be connected such that the DC bus board 5 and the main body of each power module 3 overlap each other (partially or entirely overlap each other) as viewed in the direction perpendicular to the board surface of the DC bus board 5. In this case, the positive terminal 3P and the negative terminal 3N may not be provided as a pair in the same part of the power module 3.

(3) In the case where the inverter box 1A (inverter device 1) has a single inverter circuit 10, the power modules 3 can be placed only on one side of the DC bus board 5. Specifically, the inverter box 1A can be formed by either the power modules 3 forming the first inverter circuit 10A or the power modules 3 forming the second inverter circuit 10B in FIG. 1. In this case, the power modules 3 are not placed on both sides of the smoothing capacitor 40 but placed on one side of the smoothing capacitor 40 as viewed in the direction perpendicular to the board surface of the DC bus board 5. In the case where the inverter box 1A has a single inverter circuit 10, the power modules 3 may thus be placed on one side.

However, even if the inverter box 1A has a single inverter circuit 10, the power modules 3 may be placed on both sides of the smoothing capacitor 40 as viewed in the direction perpendicular to the board surface of the DC bus board 5. For example, the power modules 3 can be placed on both sides of the smoothing capacitor 40 by placing on one side of the smoothing capacitor 40 one of the three-phase power modules 3 of the inverter circuit 10 that converts electric power between three-phase AC power and DC power, and placing the remaining two power modules 3 on the other side of the smoothing capacitor 40.

(4) The above description based on FIGS. 1, 4, 5, 7, 8, etc. is given with respect to the example in which a plurality of power modules 3 provided corresponding to the arms 10L (10U, 10V, 10W) corresponding to a plurality of phases of the alternating current are arranged in line along one end surface 5L of the DC bus board 5. In this example, the smoothing capacitor 40 is formed by parallel connection of a plurality of capacitor elements 4, the number of capacitor elements 4 corresponds to the number of power modules 3, and the capacitor elements 4 are arranged so as to have a positional relation corresponding to that of the power modules 3. It should be understood that in the case where the power modules 3 corresponding to the phases are not aligned in this manner, the capacitor elements 4 may be arranged and distributed independently of the arrangement of the power modules 3. Even if the power modules 3 corresponding to the phases are aligned as described above, the capacitor elements 4 may be arranged and distributed independently of the arrangement of the power modules 3.

(5) The above description is given by using the example in which the smoothing capacitor 40 is formed by parallel connection of a plurality of capacitor elements 4. However, it should be understood that the smoothing capacitor 40 may be formed by a single element. In the above description, electrolytic capacitors are exemplarily shown as the capacitor elements 4. However, elements having other structures such as film capacitors may be used as the capacitor elements 4.

INDUSTRIAL APPLICABILITY

The present invention can be used for inverter devices that include a power module having a switching element and a smoothing capacitor, and that convert electric power between DC power and AC power.

DESCRIPTION OF THE REFERENCE NUMERALS

1: Inverter Device
1A: Inverter Box (Inverter Device)
1B: Base Case (Inverter Case)
1C: Cover Case (Inverter Case)
3: Power Module
3N: Negative Terminal
3P: Positive Terminal
4: Capacitor Element
5: DC Bus Board
5C: Connection Terminal Surface
5H: Conducting Through Hole
5N: Negative Electrode Pattern
5P: Positive Electrode Pattern
7: First Terminal block (Fixing Member)
8: Control Board
9: Fastening Member
10: Inverter Circuit
10A: First Inverter Circuit (Inverter Circuit)
10B: Second Inverter Circuit (Inverter Circuit)
10L: Arm
11: Battery (DC Power Supply)
19: Support
33: End on One Side of Power Module
40: Smoothing Capacitor
50: Substrate
51: First Board Surface
51E: First Electrode Pattern
52: Second Board Surface
52E: Second Electrode Pattern
53: Insulating Layer
55N: Connection Negative Terminal
55P: Connection Positive Terminal
57: Fastening Member Through Hole
59: Support Through Hole
E: Conductive Material
N: Negative Electrode
P: Positive Electrode

The invention claimed is:

1. An inverter device, which includes: a power module that has a positive terminal connected to a positive electrode of a DC power supply and a negative terminal connected to a negative electrode of the DC power supply, and that forms at least one arm formed by series connection of at least one switching element connected to the positive terminal and at least one switching element connected to the negative terminal; and a smoothing capacitor that is connected between the positive electrode of the DC power supply and the negative electrode of the DC power supply, and which converts electric power between DC power and AC power, comprising:

a plate-like DC bus board which has a positive electrode pattern connected to the positive electrode of the DC power supply, and a negative electrode pattern connected to the negative electrode of the DC power supply, and in which a positive-side terminal of the smoothing capacitor is electrically connected to the positive electrode pattern, a negative-side terminal of the smoothing capacitor is electrically connected to the negative electrode pattern, and to which the smoothing capacitor is fixed; and a fixing member that maintains a relative positional relation between the DC bus board and a plurality of the power modules provided corresponding to a plurality of the arms corresponding to a plurality of phases of an alternating current, wherein the DC bus board has a plurality of connection positive terminals that are electrically connected to the positive electrode pattern and that are respectively electrically connected to the positive terminals of the plurality of power modules, and a plurality of connection negative terminals that are electrically connected to the negative electrode pattern and that are respectively electrically connected to the negative terminals of the plurality of power modules, and the connection positive terminal and the positive terminal which correspond to each other are fastened to the fixing member by a common fastening member, and the connection negative terminal and the negative terminal which correspond to each other are fastened to the fixing member by a common fastening member, so that the DC bus board and the power modules are fixed to the fixing member.

2. The inverter device according to claim 1, wherein the positive terminal and the negative terminal of the power module are provided as a DC electrode terminal pair that protrude from an end on one side of the power module.

3. The inverter device according to claim 2, wherein the DC bus board includes a DC electrode pattern connection terminal pair that are electrically connected to the positive electrode pattern and the negative electrode pattern, the fixing member includes a DC power supply connection terminal pair that are connected to the positive electrode and the negative electrode of the DC power supply, and a DC bus board connection terminal pair that are electrically connected to the DC power supply terminal pair, and the DC electrode pattern connection terminal pair of the DC bus board are fastened to the DC bus board connection terminal pair by a fastening member.

4. The inverter device according to claim 2, wherein a first electrode pattern as one of the positive electrode pattern and the negative electrode pattern is formed on a first board surface of the DC bus board as one surface of an insulating layer forming a substrate, and a second electrode pattern as the other of the positive electrode pattern and the negative electrode pattern is formed on a second board surface of the DC bus board as the other surface of the insulating layer, each terminal of the DC bus board is fastened by the fastening member such that the first board surface contacts terminals provided on other members, the terminal that is electrically connected to the second electrode pattern has a connection terminal surface that is formed on the first board surface so as to be separated from the first electrode pattern, and a conducting through hole that extends through the insulating layer and that is formed separately from a fastening member through hole through which the fastening member extends, and the conducting through hole has a conductive material on its inner wall, and the second electrode pattern is electrically connected to the connection terminal surface by the conductive material.

5. The inverter device according to claim 2, wherein the power modules are placed on both sides of the smoothing capacitor as viewed in a direction perpendicular to a board surface of the DC bus board.

6. The inverter device according to claim 2, wherein the plurality of power modules provided corresponding to the plurality of arms corresponding to the plurality of phases of the alternating current are arranged in line along one end surface of the DC bus board, the smoothing capacitor is formed by parallel connection of a plurality of capacitor elements, the number of capacitor elements corresponds to that of power modules, and the capacitor elements are arranged so as to have a positional relation corresponding to that of the power modules.

7. The inverter device according to claim 2, further comprising:

two inverter circuits that convert electric power between n-phase AC power and DC power, where n represents a natural number, and the two inverter circuits are formed by placing, on both sides of the DC bus board, the power modules forming each inverter circuit, as viewed in the direction perpendicular to the board surface of the DC bus board, wherein the smoothing capacitor is formed by parallel connection of the plurality of capacitor elements, the number of capacitor elements corresponds to that of power modules, and the capacitor elements are arranged so as to have a positional relation corresponding to that of the power modules, the inverter device further comprising:

a control board that is placed so as to cover the power modules and the DC bus board as viewed in the direction perpendicular to the board surface of the DC bus board, and that controls the two inverter circuits; and an inverter case that accommodates the DC bus board, the power modules, and the fixing member, and that has at least (n−1) supports supporting and fixing the control board in a central portion of the control board, wherein the DC bus board has support through holes through which the supports extend, and each support through hole is provided between the phases of the capacitor elements arranged so as to correspond to the power modules that are arranged in line along the one end surface of the DC bus board and that form the n-phase arms.

8. The inverter device according to claim 1, wherein the DC bus board includes a DC electrode pattern connection terminal pair that are electrically connected to the positive electrode pattern and the negative electrode pattern, the fixing member includes a DC power supply connection terminal pair that are connected to the positive electrode and the negative electrode of the DC power supply, and a DC bus board connection terminal pair that are electrically connected to the DC power supply terminal pair, and the DC electrode pattern connection terminal pair of the DC bus board are fastened to the DC bus board connection terminal pair by a fastening member.

9. The inverter device according to claim 8, wherein a first electrode pattern as one of the positive electrode pattern and the negative electrode pattern is formed on a first board surface of the DC bus board as one surface of an insulating layer forming a substrate, and a second electrode pattern as the other of the positive electrode pattern and the negative electrode pattern is formed on a second board surface of the DC bus board as the other surface of the insulating layer, each terminal of the DC bus board is fastened by the fastening member such that the first board surface contacts terminals provided on other members, the terminal that is electrically connected to the second electrode pattern has a connection terminal surface that is formed on the first board surface so as to be separated from the first electrode pattern, and a conducting through hole that extends through the insulating layer and that is formed separately from a fastening member through hole through which the fastening member extends, and the conducting through hole has a conductive material on its inner wall, and the second electrode pattern is electrically connected to the connection terminal surface by the conductive material.

10. The inverter device according to claim 8, wherein the power modules are placed on both sides of the smoothing capacitor as viewed in a direction perpendicular to a board surface of the DC bus board.

11. The inverter device according to claim 8, wherein the plurality of power modules provided corresponding to the plurality of arms corresponding to the plurality of phases of the alternating current are arranged in line along one end surface of the DC bus board, the smoothing capacitor is formed by parallel connection of a plurality of capacitor elements, the number of capacitor elements corresponds to that of power modules, and the capacitor elements are arranged so as to have a positional relation corresponding to that of the power modules.

12. The inverter device according to claim 8, further comprising:
two inverter circuits that convert electric power between n-phase AC power and DC power, where n represents a natural number, and the two inverter circuits are formed by placing, on both sides of the DC bus board, the power modules forming each inverter circuit, as viewed in the direction perpendicular to the board surface of the DC bus board, wherein
the smoothing capacitor is formed by parallel connection of the plurality of capacitor elements, the number of capacitor elements corresponds to that of power modules, and the capacitor elements are arranged so as to have a positional relation corresponding to that of the power modules, the inverter device further comprising:
a control board that is placed so as to cover the power modules and the DC bus board as viewed in the direction perpendicular to the board surface of the DC bus board, and that controls the two inverter circuits; and
an inverter case that accommodates the DC bus board, the power modules, and the fixing member, and that has at least (n−1) supports supporting and fixing the control board in a central portion of the control board, wherein
the DC bus board has support through holes through which the supports extend, and each support through hole is provided between the phases of the capacitor elements arranged so as to correspond to the power modules that are arranged in line along the one end surface of the DC bus board and that form the n-phase arms.

13. The inverter device according to claim 1, wherein
a first electrode pattern as one of the positive electrode pattern and the negative electrode pattern is formed on a first board surface of the DC bus board as one surface of an insulating layer forming a substrate, and a second electrode pattern as the other of the positive electrode pattern and the negative electrode pattern is formed on a second board surface of the DC bus board as the other surface of the insulating layer,
each terminal of the DC bus board is fastened by the fastening member such that the first board surface contacts terminals provided on other members,
the terminal that is electrically connected to the second electrode pattern has a connection terminal surface that is formed on the first board surface so as to be separated from the first electrode pattern, and a conducting through hole that extends through the insulating layer and that is formed separately from a fastening member through hole through which the fastening member extends, and
the conducting through hole has a conductive material on its inner wall, and the second electrode pattern is electrically connected to the connection terminal surface by the conductive material.

14. The inverter device according to claim 13, wherein the power modules are placed on both sides of the smoothing capacitor as viewed in a direction perpendicular to a board surface of the DC bus board.

15. The inverter device according to claim 13, wherein the plurality of power modules provided corresponding to the plurality of arms corresponding to the plurality of phases of the alternating current are arranged in line along one end surface of the DC bus board, the smoothing capacitor is formed by parallel connection of a plurality of capacitor elements, the number of capacitor elements corresponds to that of power modules, and the capacitor elements are arranged so as to have a positional relation corresponding to that of the power modules.

16. The inverter device according to claim 13, further comprising:
two inverter circuits that convert electric power between n-phase AC power and DC power, where n represents a natural number, and the two inverter circuits are formed by placing, on both sides of the DC bus board, the power modules forming each inverter circuit, as viewed in the direction perpendicular to the board surface of the DC bus board, wherein
the smoothing capacitor is formed by parallel connection of the plurality of capacitor elements, the number of capacitor elements corresponds to that of power modules, and the capacitor elements are arranged so as to have a positional relation corresponding to that of the power modules, the inverter device further comprising:
a control board that is placed so as to cover the power modules and the DC bus board as viewed in the direction perpendicular to the board surface of the DC bus board, and that controls the two inverter circuits; and
an inverter case that accommodates the DC bus board, the power modules, and the fixing member, and that has at least (n−1) supports supporting and fixing the control board in a central portion of the control board, wherein
the DC bus board has support through holes through which the supports extend, and each support through hole is provided between the phases of the capacitor elements arranged so as to correspond to the power modules that are arranged in line along the one end surface of the DC bus board and that form the n-phase arms.

17. The inverter device according to claim 1, wherein the power modules are placed on both sides of the smoothing capacitor as viewed in a direction perpendicular to a board surface of the DC bus board.

18. The inverter device according to claim 1, wherein the plurality of power modules provided corresponding to the plurality of arms corresponding to the plurality of phases of the alternating current are arranged in line along one end surface of the DC bus board, the smoothing capacitor is formed by parallel connection of a plurality of capacitor elements, the number of capacitor elements corresponds to that of power modules, and the capacitor elements are arranged so as to have a positional relation corresponding to that of the power modules.

19. The inverter device according to claim 1, further comprising:
- two inverter circuits that convert electric power between n-phase AC power and DC power, where n represents a natural number, and the two inverter circuits are formed by placing, on both sides of the DC bus board, the power modules forming each inverter circuit, as viewed in the direction perpendicular to the board surface of the DC bus board, wherein
- the smoothing capacitor is formed by parallel connection of the plurality of capacitor elements, the number of capacitor elements corresponds to that of power modules, and the capacitor elements are arranged so as to have a positional relation corresponding to that of the power modules, the inverter device further comprising:
- a control board that is placed so as to cover the power modules and the DC bus board as viewed in the direction perpendicular to the board surface of the DC bus board, and that controls the two inverter circuits; and
- an inverter case that accommodates the DC bus board, the power modules, and the fixing member, and that has at least (n−1) supports supporting and fixing the control board in a central portion of the control board, wherein
- the DC bus board has support through holes through which the supports extend, and each support through hole is provided between the phases of the capacitor elements arranged so as to correspond to the power modules that are arranged in line along the one end surface of the DC bus board and that form the n-phase arms.

* * * * *